United States Patent
Wolfsjäger et al.

(10) Patent No.: US 8,091,451 B2
(45) Date of Patent: Jan. 10, 2012

(54) POWER DIVIDER FOR MOTOR VEHICLES COMPRISING A CONTROLLED FRICTION COUPLING

(75) Inventors: Erich Wolfsjäger, Ernsthofen (AT); Dietmar Gall, Vienna (AT); Marcus Friedl, Fehring (AT); Markus Krogger, Waldbach (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 926 days.

(21) Appl. No.: 11/919,160

(22) PCT Filed: Apr. 27, 2006

(86) PCT No.: PCT/EP2006/003936
§ 371 (c)(1),
(2), (4) Date: Apr. 28, 2008

(87) PCT Pub. No.: WO2006/128533
PCT Pub. Date: Dec. 7, 2006

(65) Prior Publication Data
US 2010/0012455 A1   Jan. 21, 2010

(30) Foreign Application Priority Data
Apr. 28, 2005  (AT) .............................. GM278/2005 U

(51) Int. Cl.
*B60K 23/08*  (2006.01)
(52) U.S. Cl. ................. 74/665 GA; 192/84.6; 192/84.7; 192/93 A; 180/247
(58) Field of Classification Search ................. 192/84.6, 192/84.7, 93 A, 70.23, 70.24; 74/34, 665 G, 74/665 GA, 72.7; 180/247
See application file for complete search history.

(56) References Cited

U.S. PATENT DOCUMENTS

| 4,805,486 A | 2/1989 | Hagiwara et al. |
| 4,895,236 A | 1/1990 | Sakakibara et al. |
| 4,901,598 A * | 2/1990 | Batchelor et al. ........ 74/665 GA |
| 4,950,214 A | 8/1990 | Botterill |
| 5,007,886 A | 4/1991 | Holmquist et al. |
| 5,080,640 A | 1/1992 | Botterill |
| 5,423,235 A | 6/1995 | Botterill et al. |
| 5,967,939 A | 10/1999 | Reik et al. |
| 6,173,624 B1 | 1/2001 | Decker |

(Continued)

FOREIGN PATENT DOCUMENTS
DE  3908478 A1  10/1989
(Continued)

*Primary Examiner* — David D Le
*Assistant Examiner* — Ryan Dodd
(74) *Attorney, Agent, or Firm* — Harness, Dickey & Pierce, P.L.C.

(57) ABSTRACT

The invention relates to a power divider for motor vehicles, comprising a housing (1), a primary shaft (2) having a drive connection to a first driven axis, a controlled friction coupling (4) and a displacement drive (6, 7, 8) for the drive of a second driven axis. The friction coupling (4) can be actuated by means of two ramp rings (1, 16) which can rotate counter to each other and which comprise articulated jacks (19, 20). In order to use the toothed wheels as a displacement drive and to provide a compact and economical actuator, the control curves are embodied on a control cam (25) which comprises two control sliding tracks (35, 36) which are offset in relation to each other and can be rotated about a parallel axis in relation to the axis of primary shaft (2). The control cam (25) is rotationally mounted on the second toothed wheel (7) or the shaft thereof (9).

20 Claims, 3 Drawing Sheets

U.S. PATENT DOCUMENTS

| | | |
|---|---|---|
| 6,296,590 B1 | 10/2001 | Gassmann |
| 6,367,344 B1 | 4/2002 | Vogt et al. |
| 6,398,686 B1 | 6/2002 | Irwin |
| 6,405,822 B1 | 6/2002 | Lee |
| 6,874,609 B2 | 4/2005 | Bai |
| 7,032,733 B2 * | 4/2006 | Parigger .................. 192/84.6 |
| 7,081,064 B2 | 7/2006 | Mueller et al. |
| 7,178,652 B2 | 2/2007 | Mueller |
| 7,473,209 B2 | 1/2009 | Todd et al. |
| 2003/0029690 A1 | 2/2003 | Reisinger |
| 2004/0077450 A1 | 4/2004 | Lippitsch |
| 2005/0103143 A1 | 5/2005 | Riegler et al. |
| 2006/0081436 A1 * | 4/2006 | Puiu ......................... 192/70.23 |

FOREIGN PATENT DOCUMENTS

| | | |
|---|---|---|
| GB | 1233831 A | 6/1971 |
| JP | 3066927 A | 3/1991 |
| JP | 11-270654 | 10/1999 |
| RU | 2021918 C1 | 10/1994 |
| RU | 2219077 C2 | 12/2003 |
| SU | 860688 A1 | 8/1981 |
| WO | 01/59331 A1 | 8/2001 |
| WO | 03/054426 A1 | 7/2003 |

* cited by examiner

POWER DIVIDER FOR MOTOR VEHICLES COMPRISING A CONTROLLED FRICTION COUPLING

CROSS-REFERENCE TO RELATED APPLICATIONS

This application is a 371 National Stage of International application No. PCT/EP2006/003936, filed Apr. 27, 2006. This application claims the benefit of Austrian patent application GM 278/2005, filed Apr. 28, 2005. The disclosure(s) of the above applications are incorporated herein by reference.

FIELD

The invention relates to a transfer case for motor vehicles comprising a housing, a primary shaft having a drive connection to a first driven axle, a controlled friction clutch and an offset drive for the drive of a second driven axle, said offset drive comprising a first gear controllably driven by the friction clutch and a second gear meshing therewith and a third gear meshing with the second gear, with the friction clutch being actuable by means of two ramp rings rotatable with respect to one another and each ramp ring having an articulated jack whose outer end rides on a control curve.

BACKGROUND

This section provides background information related to the present disclosure which is not necessarily prior art.

Transfer cases are used in different constellations. They can be with or without a central differential, with a differential lock or a switchable drive of the second driven axle, with or without a step-down stage. They are installed in the longitudinal direction as a rule. The use of a friction clutch also allows the continuous control of the torque transmitted by it in addition to a gentle clutch engagement. This should work as precisely and as fast as possible.

A generic transfer case is known from WO 01/59331 A1 whose offset drive contains a toothed chain and whose articulated jacks cooperate with a drum-shaped link which is rotatable around an axis arranged transversely to the primary shaft. This is first kinematically unfavorable, not least because the ends of the articulated jacks describe circular paths on the drum-shaped link. Furthermore, the drum-shaped link causes a position of the control drive which unfavorably influences the space requirements of the transfer case, which above all comes into play with a transfer case without a differential and/or an off-road gear stage which has a short constructional length. Finally, the articulated jacks prohibit the design of the offset drive as a wheel drive since they would collide with the shaft of an intermediate gear. A wheel drive comprises a plurality (usually three, but there may also be two or four) mutually meshing gears and has specific advantages with respect to a chain drive.

SUMMARY

This section provides a general summary of the disclosure, and is not a comprehensive disclosure of its full scope or all of its features.

It is thus an object of the invention to provide a transfer case which has favorable installation dimensions due to a special arrangement of the components actuating the articulated jacks and whose offset drive can be carried out with gears.

This is achieved in accordance with the invention in that the control curves are arranged on a control cam which has two control cam tracks mutually offset in the peripheral direction and which is rotatable around an axis parallel to the axis of the primary shaft, with the control cam being rotatably supported on the second gear or its shaft. The control cam with its two cam tracks and the parallel alignment of its axis of rotation is ideal kinematically and provides the favorable installation dimensions of the transfer case with its control drive. The support of the control cam on the intermediate gear solves the collision problem, minimizes the space requirements of the control elements and provides the control cam with a precise support over a large diameter. If, furthermore, the control cam tracks are disposed in one plane, the space economy becomes even better and the control cam becomes a particularly simple component. Since the cam tracks rise in the radial direction, the total periphery of the control cam is available for the two cam tracks. With a large radial extent of the cam track—which anyway results from the support on the intermediate gear—a large path is available for the cam track itself, which permits a sensitive control of the clutch.

The demand for inherent safety is largely taken into account when the control cam tracks rise in one sense of rotation which is opposite to the sense of rotation of the second gear. In other words, the opening direction of rotation of the control cam track is the same as the sense of rotation of the second gear, or the supply direction of rotation is opposite to it. The control cam is thus taken along in the sense of an opening of the clutch if, for example, the bearing between the control cam and the second gear becomes defective and seizes. A rigid coupling of the drive of the second driven axle critical for driving safety is thus prevented.

A very simple drive of the control cam is achieved in a further development of the invention in that it is rotationally fixedly connected to or is in one piece with a fourth gear which meshes with a starting gear of an electric gear motor.

Further areas of applicability will become apparent from the description provided herein. The description and specific examples in this summary are intended for purposes of illustration only and are not intended to limit the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

An exemplary embodiment of the present invention will now be more fully described with reference to the accompanying drawings.

Figure 1:
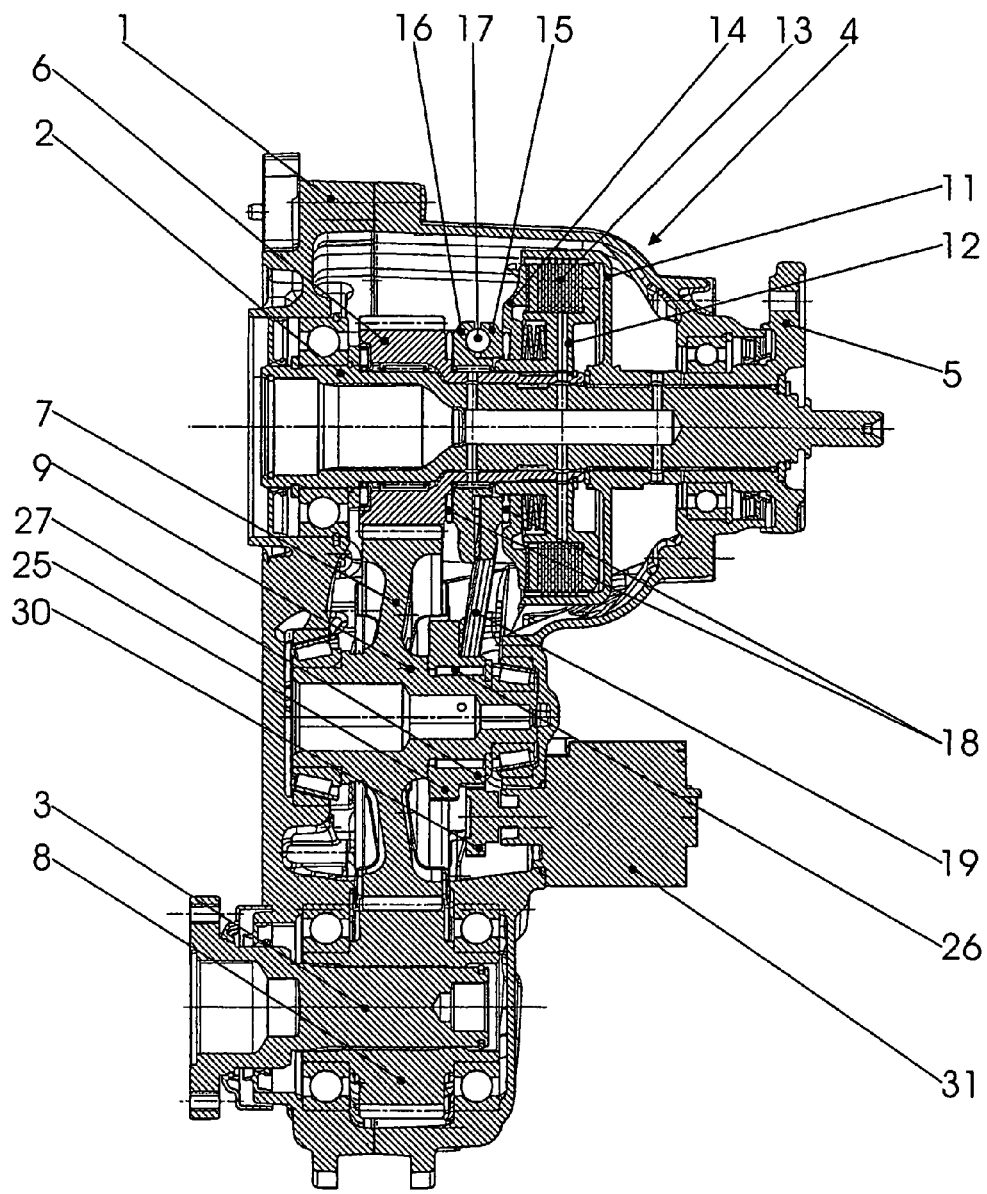
FIG. 1 is a section through a transfer case in accordance with the invention.

The housing of a transfer case is designated in sum with 1 in FIG. 1. It contains a primary shaft 2, a secondary shaft 3, a friction clutch 4 with its actuator and an offset drive. The primary shaft 2 is connected at the left hand drawing side to a drive source, for instance the manual transmission of a motor vehicle, which is not shown, and is connected on the right hand side of the drawing via a flange 5 to a first driven axle, not shown. The clutch 4 and a first gear 6 of the offset drive is located on the primary shaft 2. First gear 6 of the offset drive meshes with a second gear 7 which is arranged on an intermediate shaft 9 and which in turn again meshes with a third gear 8 which is rotationally fixedly connected to the secondary shaft 3 from which the second axle of the motor vehicle is driven. The shafts 2, 3 and 9 are supported and sealed in a familiar manner in the housing 1. Their number and arrangement is only to be understood as an example here.

The clutch 4 is a disk clutch whose outer part 11 is rotationally fixedly connected to the primary shaft 2 and whose inner part 12 is rotationally fixedly connected to the first gear 6. A disk package 13 is between the two clutch parts 11, 12 and its disks are alternately rotationally fixedly connected to the one (11) or the other (12) clutch part. A pressure plate 14, which can be acted on by a ramp ring unit, adjoins the disk package 13.

The ramp ring unit comprises a first ramp ring 15 on the side of the pressure plate 14, a second ramp ring 16 on the side of the first gear 6 and spheres 17 distributed therebetween over the periphery. Since the ramp rings are only rotated for the actuation of the clutch 4, but are seated on rotating parts, bearings are provided, in particular needle bearings 18 also absorbing axial forces. In the embodiment shown, the spheres cooperate with grooves, not shown in detail, which rise in the peripheral direction. Different construction types are, however, also possible. What is important is that the rotation of the two ramp rings 15, 16 in the opposite sense drives them apart in the axial direction.

Figure 2:
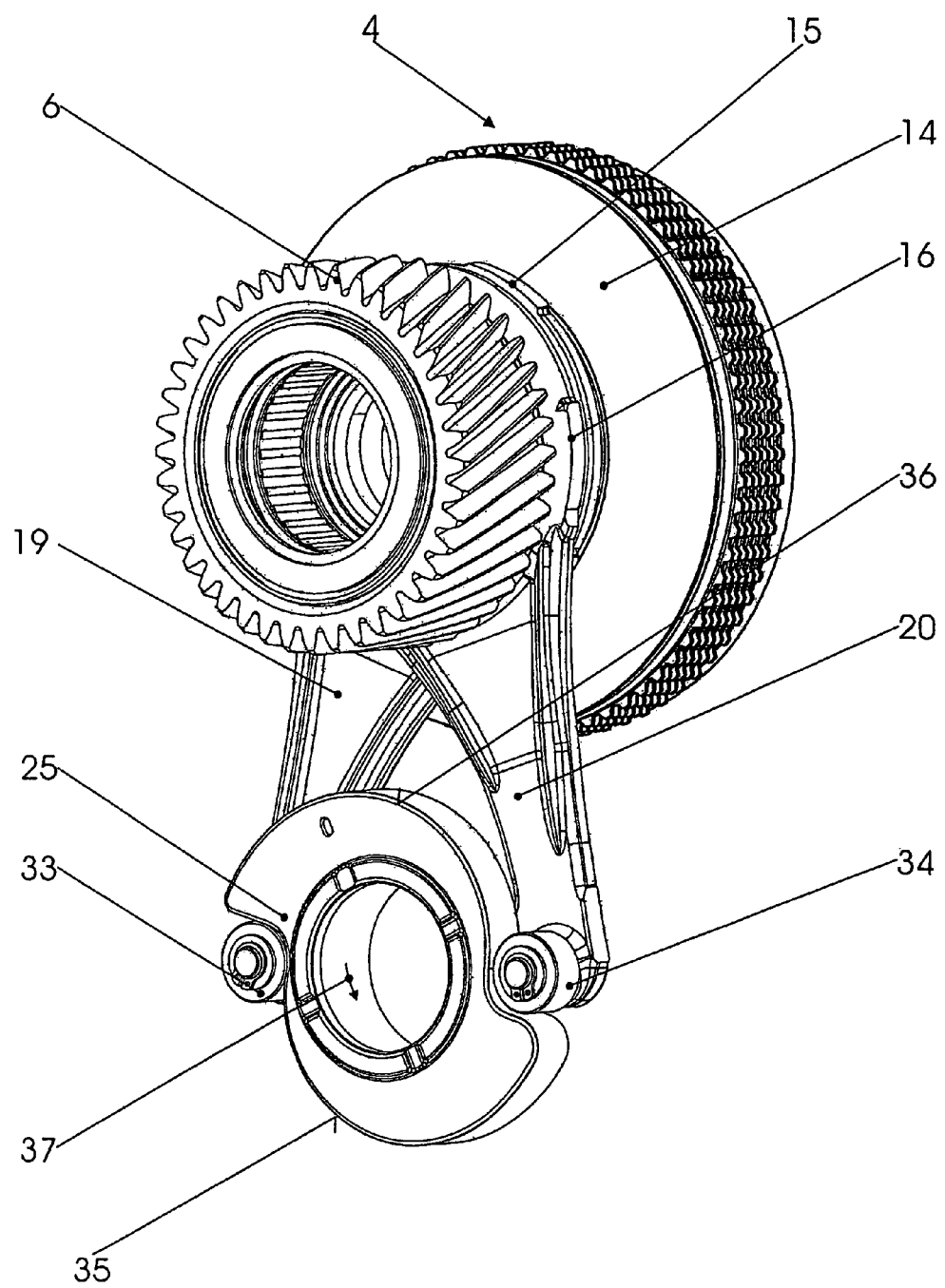
FIG. 2 is an axonometric part view from the oblique front.
Figure 3:
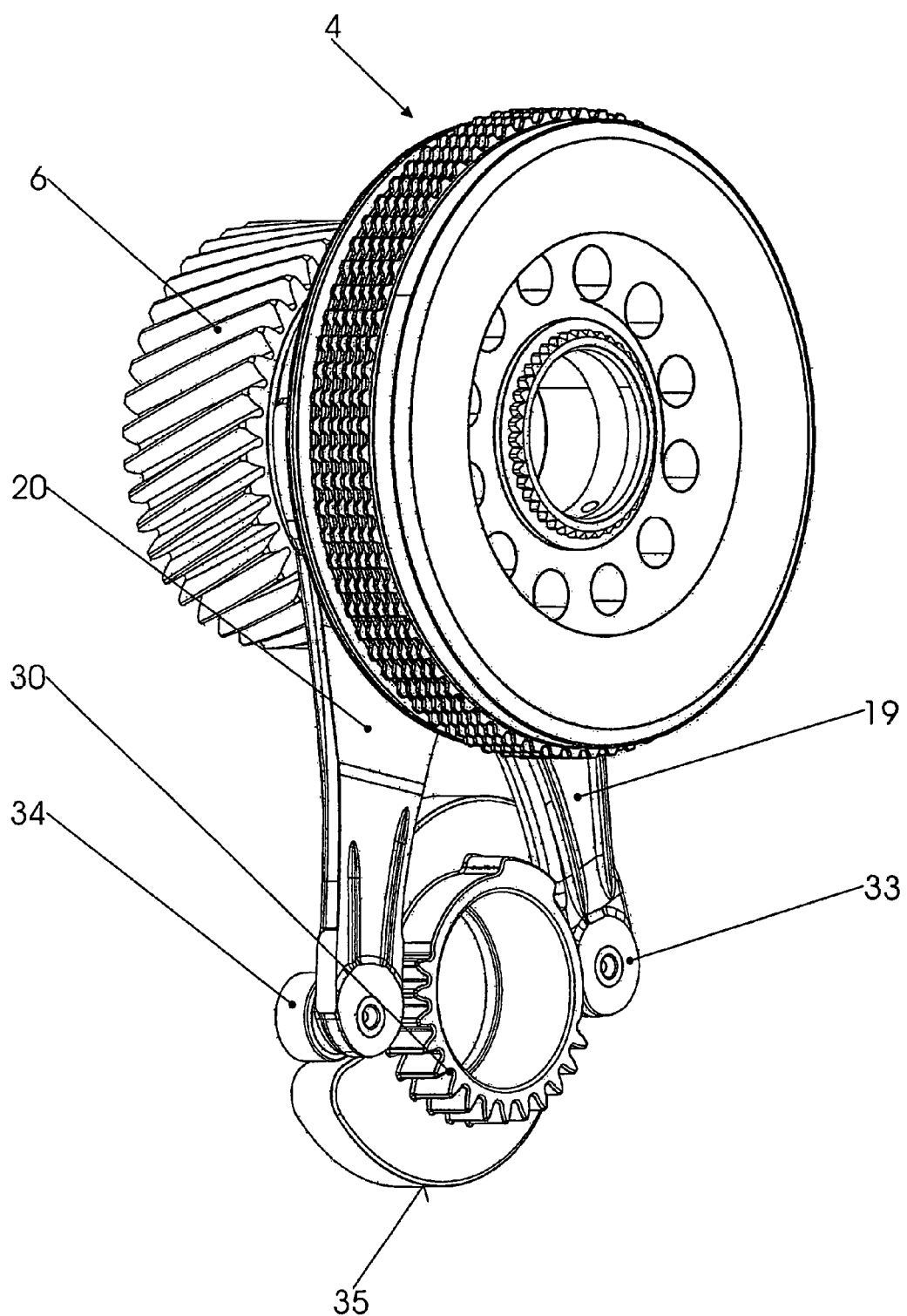
FIG. 3 is an axonometric part view from the oblique rear.

A respective articulated jack 19, 20 is attached to the ramp rings 15, 16 or is in one piece therewith; the first articulated jack 19 and the second articulated jack 20 can be best seen in FIG. 2 and FIG. 3. The ends of the articulated jacks 19, 20 ride on a control cam 25 which is supported on the intermediate shaft 9 of the second gear 7 by means of needle bearings 26. Since the second gear 7 is in one piece with the intermediate shaft 9, the control cam 25 is actually supported on the second gear 7. A fourth gear 27 is fixedly connected to the control cam 25 or is in one piece with it and meshes with the output gear 30 of an electric gear motor 31 only indicated. As such, rotation of the fourth gear 27 upon actuation of the electric gear motor 31 controls rotation of the control cam 25.

The actuator mechanism of the clutch 4 is shown in two different directions of view in FIGS. 2 and 3 with the housing and the offset drive being omitted. The articulated jacks 19, 20 start from the two ramp rings 15, 16. They have rolls 33, 34 at their ends which ride on the control cam 25. The control cam 25 is a thick plate whose contour is formed by two centrally symmetrical control cam tracks 35, 36, which are mutually offset on a semi-circle and on which the rolls 33, 34 roll upon rotation of the control cam 25 and pivot the articulated jacks 19, 20 in the opposite sense in so doing. The ramp rings 15, 16 thereby likewise rotate in the opposite sense and in so doing engage the disk clutch 4 to a certain degree. The clutch is disengaged in the shown position of the articulated jacks 19, 20. If the control cam 25 in FIG. 2 is rotated clockwise, the clutch is engaged. A direction arrow 37 indicates the sense of rotation of the intermediate shaft 9 on which the control cam 25 is supported. If the needle bearing 26 is defective or even seizes, the control cam 25 is taken along counter clockwise and thus moves the clutch 4 into the position shown in FIG. 2 in which it does not transmit any torque. It thus moves into the safest state automatically in the event of a defect.

The foregoing description of the exemplary embodiment has been provided for purposes of illustration and description. It is not intended to be exhaustive or to limit the invention. Individual elements or features of a particular embodiment are generally not limited to this particular embodiment but, where applicable, are interchangeable and can be used in another selected embodiment, even if not specifically shown or described. The same may also be varied in many ways. Such variations are not to be regarded as a departure from the invention, and all such modifications are intended to be included within the scope of the invention.

The invention claimed is:

1. A transfer case for motor vehicles comprising a housing, a primary shaft having a drive connection to a first driven axle, a controlled friction clutch and an offset drive for the drive of a second driven axle, the offset drive having a first gear controllably driven by the friction clutch, a second gear and a third gear, with the friction clutch being actuable by means of two ramp rings rotatable with respect to one another and each ramp ring having an articulated jack whose outer end rides on a control curve, wherein the control curves are formed on a control cam which has two mutually offset control cam tracks and is rotatable around an axis parallel to the axis of the primary shaft, with the control cam being rotatably supported on the second gear or on its shaft.

2. The transfer case in accordance with claim 1, wherein the control cam tracks lie in one plane.

3. The transfer case in accordance with claim 1, wherein the control cam tracks rise in a sense of rotation which is opposite to the sense of rotation of the second gear.

4. The transfer case in accordance with claim 1, wherein the control cam is rotationally fixedly connected to a fourth gear which meshes with a starting gear of an electric gear motor.

5. The transfer case of claim 1 further comprising a secondary shaft having a drive connection to the second axle and an intermediate shaft rotatably supported in the housing between the primary and secondary shafts, wherein the third gear is fixed for rotation with the secondary shaft and the second gear is fixed for rotation with the intermediate shaft and is in meshed engagement with both of the first and third gears.

6. The transfer case of claim 5 wherein the control cam is rotatably supported by one of the second gear and the intermediate shaft and is controllably driven by an electric motor, wherein the control cam tracks are configured to cause the articulated jacks to pivot in the opposite directions in response to rotation of the control cam.

7. The transfer case of claim 6 wherein a first one of the articulated jacks extends from a first one of the two ramp rings, wherein a second one of the articulated jacks extends from a second one of the two ramp rings, wherein the first and second ramp rings surround the primary shaft and are disposed between the first gear and the friction clutch, and wherein the first and second articulated jacks are configured to engage the control cam tracks formed on opposite sides of the control cam so as to cause rotation of the first and second ramp rings in opposite directions.

8. A transfer case for motor vehicles having a drive source and first and second axles, comprising:
a housing;
a first shaft rotatably supported by said housing and coupling the drive source to the first axle;

a second shaft rotatably supported by said housing and coupled to the second axle;

an offset drive having a first gear rotatably supported on said first shaft, a second gear fixed to said second shaft and a third gear rotatably supported by said housing and meshed with said first and second gears;

a friction clutch having a first clutch member fixed for rotation with said first shaft, a second clutch member fixed for rotation with said first gear, a clutch pack disposed between said first and second clutch members, and a pressure plate that is axially moveable relative to said clutch pack; and a clutch actuator including a ramp ring unit disposed between said first gear and said pressure plate, a control cam rotatably supported by said third gear, and a power-operated device for controlling rotation of said control cam, said ramp ring unit including a first ring having a first elongated jack, a second ring having a second elongated jack, and a ramp mechanism operable to convert relative rotation between said first and second rings into axial translation of said second ring for controlling axial movement of said pressure plate relative to said clutch pack, said control cam is configured to define first and second centrally symmetrical cam tracks that are mutually offset and engaged by corresponding ones of said first and second jacks such that rotation of said control cam by said power-operated device causes said first and second cam tracks to forcibly pivot said first and second jacks in opposite directions for causing said first and second rings to rotate in opposite directions.

9. The transfer case of claim 8 wherein said control cam is rotatable about a rotary axis that is parallel to a rotary axis of said first shaft.

10. The transfer case of claim 8 wherein said third gear is fixed to or formed integral with an intermediate shaft rotatably supported in said housing between said first and second shafts.

11. The transfer case of claim 10 wherein said control cam is rotatably supported on one of said third gear and said intermediate shaft and includes a fourth gear that is driven by an output gear of said power-operated device.

12. The transfer case of claim 8 wherein said first jack extends from said first ring and includes a first follower in rolling engagement with said first cam track on said control cam, and wherein said second jack extends from said second ring and includes a second follower in rolling engagement with said second cam track.

13. The transfer case of claim 12 wherein said first ring and said second ring are rotatably supported on an elongated tubular portion of said first gear which surrounds said first shaft, and wherein said ramp mechanism includes grooves formed in at least one of said first and second rings and balls disposed in said grooves for causing axial movement of said second ring relative to said first ring in response to opposite rotation between said first and second rings.

14. The transfer case of claim 8 wherein said first gear includes a tubular shaft portion that is rotatably supported on said first shaft, wherein said second clutch member of said friction clutch is fixed to said tubular shaft portion of said first gear, and wherein said ramp ring unit is rotatably supported on said tubular shaft portion of said first gear.

15. A transfer case for motor vehicles having first and second axles, comprising:

a first shaft in driven connection with the first axle;

a second shaft in driven connection with the second axle;

an offset drive having a first gear rotatably supported on said first shaft, a second gear fixed for rotation with said second shaft, and a third gear meshed with said first and second gears;

a friction clutch having a first clutch member driven by said first shaft, a second clutch member driving said first gear, and a clutch pack disposed therebetween; and a clutch actuator including a ramp ring unit, a control cam rotatably supported by said third gear, and a power-operated device for selectively rotating said control cam, said ramp ring unit including a first elongated jack and a second elongated jack, said control cam defining first and second centrally symmetrical cam tracks that are mutually offset and engaged by end portions of corresponding ones of said first and second jacks such that rotation of said control cam causes pivotal movement of said first and second jacks in opposite directions for controlling engagement of said friction clutch.

16. The transfer case of claim 15 wherein said control cam is rotatable about a rotary axis that is parallel to a rotary axis of said first shaft.

17. The transfer case of claim 15 wherein said third gear is fixed to or formed integral with an intermediate shaft rotatably supported in said housing between said first and second shafts.

18. The transfer case of claim 17 wherein said control cam is rotatably supported on one of said third gear and said intermediate shaft and includes a fourth gear that is driven by an output gear of said power-operated device.

19. The transfer case of claim 15 wherein said first jack extends from a first ramp ring and includes a first follower in rolling engagement with said first cam track on said control cam, and wherein said second jack extends from a second ramp ring and includes a second follower in rolling engagement with said second cam track.

20. The transfer case of claim 19 wherein said first ramp ring and said second ramp ring are rotatably supported on an elongated tubular portion of said first gear which surrounds said first shaft, and wherein said ramp ring unit further includes grooves formed in at least one of said first and second ramp rings and rollers disposed in said grooves for causing axial movement of said second ramp ring relative to said first ramp ring in response to opposite rotation between said first and second ramp rings.

* * * * *